United States Patent [19]

Kamikaseda et al.

[11] Patent Number: 4,634,727

[45] Date of Patent: Jan. 6, 1987

[54] EMULSION ADHESIVES

[75] Inventors: Takeshi Kamikaseda, Suita; Masahiro Furudate, Osaka; Makoto Yamamoto, Shiga, all of Japan

[73] Assignee: National Starch and Chemical Corporation, Bridgewater, N.J.

[21] Appl. No.: 804,212

[22] Filed: Dec. 3, 1985

[30] Foreign Application Priority Data

Dec. 10, 1984 [JP] Japan ................................. 59-261577

[51] Int. Cl.$^4$ ............................................... C08K 5/52
[52] U.S. Cl. ........................ 524/145; 524/555; 524/556; 524/558; 524/563; 524/564
[58] Field of Search ............... 524/145, 563, 564, 555, 524/556, 558

[56] References Cited

U.S. PATENT DOCUMENTS

| 2,339,775 | 1/1944 | Ether | 524/145 |
| 2,646,371 | 7/1953 | McGarry | 524/145 |
| 2,818,169 | 12/1957 | Bergstedt | 524/145 |
| 2,877,922 | 3/1959 | De Cristoforo | 524/145 |
| 3,471,415 | 10/1969 | Friedman | 524/145 |
| 4,691,170 | 5/1978 | Godfrey | 524/145 |

FOREIGN PATENT DOCUMENTS

| 2448560 | 10/1980 | France | 524/145 |
| 0566048 | 12/1944 | United Kingdom | 524/145 |

Primary Examiner—Joseph L. Schofer
Assistant Examiner—J. M. Reddick
Attorney, Agent, or Firm—Ellen T. Dec

[57] ABSTRACT

An adhesive composition based on a polyvinyl acetate emulsion for bonding wood and other porous substrates, which contains lecithin as a built-in lubricant. Lecithin in this adhesive composition assists in release of the adhesive from the press platen, etc. in the manufacture of plywood or other products.

4 Claims, No Drawings

EMULSION ADHESIVES

BACKGROUND OF THE INVENTION

1. Field of the Invention

This invention relates to an emulsion adhesive composition for use in bonding wood and other substrates.

2. Description of the Prior Art

In the bonding of wood and other porous substrates, an emulsion adhesive composition based on a polyvinyl acetate emulsion has been commonly employed. Bonding by means of such an adhesive is effected by applying the adhesive to a plurality of members of wood or the like and pressing them together between a pair of metal platens. In this process, the emulsion adhesive is squeezed out from the glue line and cures between the substrate and the metal platens so that withdrawal of the product from the platens at completion of bonding is often difficult. Moreover, the adhesive squeezed out from the glue line at pressing sticks to the platens and cures in situ so that it takes much time and labor to remove the cured adhesive and clean the surfaces of the platens.

These problems are particularly onerous in finger joint work in which the glue line comes in direct contact with the platens, edge gluing in the manufacture of laminated wood, and veneer lamination and other works where the adhesive may strike through the thin members. Moreover, the problem of sticking and curing of the adhesive occurs not only with the platens mentioned above but also with other spreaders or coating machines used for the application of such adhesives, and a great deal of effort is required in removing the cured masses of splashed or spilt adhesive.

To overcome these problems, it has been proposed to coat the working surface of the press or coater directly with a surface lubricant such as silicone, wax, lecithin or the like. When such a provision is made, removal of the cured adhesive is facilitated by the action of the lubricant but the application of a surface lubricant means the addition of one new process step to the production line and, hence, an increase in production time as well as an additional material cost because a large amount of lubricant is required for satisfactory results.

It might be contemplated to use a solvent dilution of the lubricant but the practice would require a further process for dilution and need application of the lubricant with a greater frequency. Furthermore, when a silicone or a wax is used as the surface lubricant, the lubricant stuck to the surface of the product must be removed with a sanding paper or the like in order that the product may be receptive to a coating composition, with the result that the bonded product cannot be immediately coated. This is also a serious disadvantage.

It is, therefore, obvious that if a property that will permit easy removal of cured emulsion adhesive from the press or coater can be built into the adhesive itself and, at the same time, the bonding strength of the adhesive be improved, all of the above-mentioned problems will be solved at once and the utility of the emulsion adhesive be further expanded.

DESCRIPTION OF THE INVENTION

It is an object of this invention to provide a new emulsion adhesive composition, with which the use of a surface lubricant can be dispensed with and the adhesive stuck to the press or the like and cured in situ can be easily removed and which has a bonding strength surpassing those of the conventional emulsion adhesives.

The above object is accomplished by the present invention which is concerned with an emulsion adhesive composition based on a polyvinyl acetate emulsion in which lecithin has been incorporated.

Thus, the emulsion adhesive composition according to this invention contains lecithin and this lecithin forms a film over the interface between the glue line and wooden substrate at bonding. The pattern of distribution of such lecithin film is not limited to said interface between substrate and adhesive layer but extends to the interface between the adhesive squeezed out onto the platens of the press from the glue line and the very surfaces of the platens. The lecithin film across the interface between wooden substrate and adhesive layer is quickly absorbed into the wooden substrate, with the result that an adhesive layer is formed directly on the substrate without interposition of lecithin so as to allow the adhesive component to fully display its bonding action. In this case, due to the emulsifying action of lecithin, the adhesive component finds its way deep into the substance of the wooden substrate to exhibit an anchoring effect, thus contributing to an increased bonding strength. On the other hand, lecithin distributed in film form over the interface between the press platen and the adhesive squeezed out onto the platen surface is not absorbed into the platens which have impervious surfaces, so that the adhesive squeezed out onto the platens cures on the lecithin film. Therefore, by removing the cured adhesive together with the lecithin film from the platens, the cured adhesive can be easily removed from the platens.

The adhesive used in the practice of this invention is an emulsion adhesive based on a polyvinyl acetate emulsion. The term "based" as used here and elsewhere in this specification covers the case in which the entire composition is made up of a given component only. Examples of such polyvinyl acetate emulsion include an aqueous polymer dispersion prepared by polymerization of a monomeric mixture based on vinyl acetate and copolymers of vinyl acetate with one or more other copolymerizable monomers such as ethylene, acrylic acid and its esters, methacrylic acid and its esters, 2-hydroxyethyl acrylate, N-methylolacrylamide, N-methylolacrylamide ether compounds, etc., as well as various blends of such polymers.

To the polymers and blends mentioned above may be further added other blending resins or latexes such as urea resin, phenol-formaldehyde resin, melamine resin, acrylic emulsion, rubber latex, etc., as well as those additives which are commonly incorporated in adhesives such as plasticizers, film-forming auxiliaries, filling agents, solvents, etc.

Lecithin, which is incorporated in the above emulsion adhesive, is a phosphatide occurring in large amounts in egg yolk, soybean and liver. It contains both hydrophilic and hydrophobic groups and acts as a surface active agent. Lecithin as used in the practice of this invention includes not only pure lecithin but also crude lecithin. That is to say, materials containing lecithin as a predominant component can be used in accordance with this invention. While the level of addition of lecithin depends on the composition of emulsion adhesive, it is generally preferable to use 0.5 to 3.0 weight parts (in the case of crude lecithin, on a pure lecithin basis) of lecithin with respect to 100 weight parts of the nonvolatile matter in the emulsion adhesive composition. (In the following description, too, all parts are by weight.) The most desirable range is 1.0 to 2.0 parts. Thus, if the proportion of lecithin is less than 0.5 part, no sufficient effect will be obtained. If the lecithin level exceeds 3.0 parts, the bonding strength of the adhesive tends to decrease.

There are two procedures for incorporating lecithin in the emulsion adhesive. In the first procedure, lecithin is directly added to an emulsion adhesive prepared in the know manner and the mixture is stirred well. In the second procedure, lecithin is first emulsified with aqueous ammonia, for instance, and the lecithin emulsion is then added and mixed with the emulsion adhesive. When the viscosity of the emulsion adhesive is low, lecithin added directly by the first procedure may separate out with time. If such is the case, it is preferable to first prepare an emulsion of lecithin and add the emulsion to the adhesive according to the second procedure. Lecithin undergoes self-emulsification under the alkalinity of aqueous ammonia. However, if the alkalinity of aqueous ammonia is too strong, the polyvinyl acetate contained as a main component in the emulsion adhesive may be saponified. Therefore, it is appropriate to use dilute aqueous ammonia. The resultant lecithin-containing emulsion adhesive composition according to this invention can be used not only in wood-to-wood bonding but also in the bonding of wood to other materials having porous textures such as paper, fiber, slate, etc., bonding of wood with composite materials made of such a porous material and wood, and bonding between such composite materials. In such applications, the adhesive composition according to this invention gives excellent bonding results surpassing those of the conventional emulsion adhesives.

The emulsion adhesive composition according to this invention contains lecithin as aforementioned. In bonding, this lecithin spreads to form a film across the interface between the glue line and the substrate and across the interface between the press platen and the adhesive stuck thereto. The lecithin stuck to the impervious surface of the press platen is not absorbed but remains distributed on the surface, with the result that the adhesive component cures in situ on the lecithin film. Therefore, the adhesive which has been squeezed out from the glue line and cured on the press platen or the like can be easily removed by peeling off the adhesive and lecithin film as a unit. On the other hand, the lecithin spread across the interface between the substrate and glue line is absorbed into the porous substrate. As a result, a layer of the adhesive is formed directly on the substrate, thus displaying its adhesive power fully. Thus, due to the emulsifying action of lecithin, the adhesive component penetrates deep into the substrate to exhibit an anchoring effect and thereby augument the bonding strength of the adhesive layer. These effects are obtained even in the cold press process but are more remarkable in the hot press, radio frequency press and other thermal processes. This is probably because the transfer of lecithin from the adhesive composition to said interfaces is promoted by heating.

This invention has been conceived and developed on the basis of the remarkable finding that incorporation of lecithin, which is inherently a surface lubricant or mold release agent, in an emulsion adhesive not only provides for improved releasability but also contributes to the bonding strength of the adhesive. Thus, while the use of silicone or wax, in lieu of lecithin, will also contribute somewhat to this releasability, these lubricants must be used in large amounts in order to attain practically useful effects. Moreover, in contrast to lecithin, the use of these lubricants cause substantial decreases in the bonding strength of the emulsion adhesive and make the substrate non-receptive to paints and other coating materials, making it difficult to finish the product. In the case of lecithin, such problems are not encountered.

The following examples and control examples are further illustrative of this invention.

EXAMPLES 1 TO 5 AND CONTROL EXAMPLE 1

To 100-part aliquots of a crosslinked polyvinyl acetate emulsion adhesive (Kanebo-NSC, Ltd., Plylock CL-985), were respectively added 0.2, 0.5, 1.0, 1.5 and 2.0 parts of lecithin (Ajinomoto Co., Inc.) to prepare adhesive bases. Then, 100 parts of each adhesive base was mixed with 5 parts of a curing catalyst (Kanebo-NSC, Ltd., 142-2301) to give an emulsion adhesive composition. Using each of such emulsion adhesives, a 3-ply lauan plywood (Crossband) (veneer thicknesses: 0.88/1.20/0.88 mm) was laminated under the following conditions: coating weight, 300 g/m$^2$; cold press, 30 minutes; hot press, 110° C.×10 kg/cm$^2$×60 seconds. Each of the lauan plywoods thus laminated were subjected to JAS Type I Immersion-Peeling Test for Regular Plywood (4-hour boiling, 20-hour drying at 60° C., 4-hour boiling, 3-hour drying at 60° C.). The releasability of each adhesive from the press platen was also investigated and compared with that of Control Example 1. The results are shown in Table 1.

TABLE 1

| | Control Example 1 | Examples | | | | |
|---|---|---|---|---|---|---|
| | | 1 | 2 | 3 | 4 | 5 |
| CL-985 (nonvolatile matter, 50 wt. %) | 100 | 100 | 100 | 100 | 100 | 100 |
| Lecithin | 0 | 0.2 | 0.5 | 1 | 1.5 | 2.0 |
| Releasability | x | Δ | | | | |
| JAS Type I test, % delamination | 0 | 0 | 0 | 0 | 0 | 7 | x: Poor
Δ: Fair
 : Good
 : Excellent

It will be apparent from Table 1 that the adhesives according to the above examples can be easily released from the press platen and give excellent bonding results.

EXAMPLES 6 TO 9, CONTROL EXAMPLE 2

Adhesive compositions were prepared in the same manner as Examples 1 to 5 and using them, 2-ply lamination of birch boards (10 mm thick) was carried out under the following conditions.
  Coating weight: 250 g/m$^2$
  Closed assembly time: 5 minutes
  Radio frequency press (side press):
    anode voltage 4.5 kv,
    anode current 0.25 A,
    pressure: 10 kg/cm$^2$,
    current time: 80 seconds
    cooling time: 100 seconds The resultant laminates were allowed to cure at room temperature for 5 days and the compressive shear bonding strength of each laminate was measured in accordance with JIS K6852. In the test, testpieces were treated under the following two conditions.

Dry: Each testpiece was directly tested.

Wet: Each testpiece was immersed in water at room temperature for 24 hours and tested when wet.

The releasability of each adhesive from the radio frequency press was also investigated. The results as well as the compressive shear bond strength values are shown in Table 2. The results for Control Example 2 are also shown in Table 2.

TABLE 2

|  |  | Control Example | Examples | | | |
|---|---|---|---|---|---|---|
|  |  | 2 | 6 | 7 | 8 | 9 |
| CL-985 (novolatile matter, 50 wt. %) | | 100 | 100 | 100 | 100 | 100 |
| Lecithin | | 0 | 0.2 | 0.5 | 1 | 1.5 |
| Releasability | | x | Δ | : | : | : |
| Bonding strength | (Dry) kg/cm$^2$ | 200 | 207 | 211 | 203 | 205 |
|  | (Wet) | 48 | 53 | 55 | 50 | 48 | x: Poor
Δ: Fair
: Good
: Excellent

It will be apparent from Table 2 that the adhesives according to the above examples can be easily removed from the press. It is also clear that the use of lecithin tends to improve the bonding strength of the emulsion adhesive.

CONTROL EXAMPLES 3 TO 9 AND EXAMPLE 10

For the purpose of investigating any differences between lecithin and other surface lubricants, the following experiment was carried out. To a crosslinked polyvinyl acetate emulsion adhesive (Kanebo-NSC, Ltd., Kor-Lok CM-950) was added a silicone emulsion (Toshiba Silicone Co., Ltd., TSM-630) or a wax emulsion (Kyoeisha Yushi K.K., No. 13) to prepare an adhesive base. Then, a plywood was fabricated using this adhesive and the same curing catalyst as used in Examples 1 to 5. This plywood was subjected to JAS Type II Immersion-Peeling Test for Regular Plywood, releasability test, and shedding of paint. Table 3 shows the results in comparison with the results for Example 10 which contained lecithin and Control Example 9 which did not contain any lubricant.

TABLE 3

|  | Control example | | | | | | | Example |
|---|---|---|---|---|---|---|---|---|
|  | 3 | 4 | 5 | 6 | 7 | 8 | 9 | 10 |
| CM950 (nonvolatile matter, 50 wt. %) | 100 | 100 | 100 | 100 | 100 | 100 | 100 | 100 |
| No. 13 | 0.5 | 1 | 1.5 | — | — | — | — | — |
| TSM-630 | — | — | — | 1 | 2 | 3 | — | — |
| Lecithin | — | — | — | — | — | — | — | 0.6 |
| Releasability after cold press *1 | x | Δ | : | x | x | x | x | : |
| Releasability after hot press *2 | x | x | x | x | x | x | x | : |
| Shedding of paint *3 | No | No | Yes | No | No | Yes | No | No |
| JAS Type II Immersion Peeling test (%) *4 | 5 | 10 | 20 | 10 | 15 | 30 | 0 | 0 | x: Poor
Δ: Fair
: Good
: Excellent

*1: Releasability of the adhesive from the platen after cold press work.
*2: Releasability of the adhesive from the platen after cold and hot press works.
*3: Shedding of a polyester finish paint on glue line.
*4: Measured after 2-hour immersion in water at 70° C. and 3-hour drying at 60° C.

It will be apparent from Table 3 that while the use of wax provides for fair releasability after the cold press work, it contributes little to releasability after the hot press work, so that much labor is required for removal of the adhesive from the hot press platen. Moreover, at the level of addition of 1.5 parts, the plywood sheds the painting and cannot be directly finished. Cilicone did not allow for releasability even after the cold press work. It is also seen that both wax and silicone cause decreases in bonding strength. In contrast, Example 10 shows excellent releasability not only after cold press work but even after hot press work. Moreover, it showed no reduction in bonding strength, nor did the product plywood reject the coating material.

EXAMPLE 11 AND CONTROL EXAMPLE 10

To 100 parts of a crosslinked polyvinyl acetate emulsion adhesive (Kanebo-NSC, Ltd., Durolock 1M410) was added 0.8 part of lecithin to give an adhesive base. To 100 parts of this adhesive base was added 5 parts of a curing catalyst (Kanebo-NSC, Ltd., 142-2302) to give an adhesive composition. Using this adhesive composition, boards of Japanese beech wood, 30 mm thick and 30 mm wide, were bonded to give a 3-ply laminate. The bonding conditions were the same as those used in Examples 6 to 9. The testpiece was allowed to cure at room temperature for 5 days and subjected to JAS Immersion-Peeling Test for Structural Laminates (6-hour immersion in water and 18-hour drying at 40° C.). The results are shown in Table 4 alongside the results for Control Example 10 which corresponded to Example 11 except that lecithin was not used.

TABLE 4

|  |  | Control Example 10 | Example 11 |
|---|---|---|---|
| Durolock 1M410 (nonvolatile matter, 50 wt. %) | | 100 | 100 |
| Lecithin | | 0 | 0.8 |
| 142-2302 | | 5 | 5 |
| Releasability | | x | : |
| Immersion-peeling test, % delamination | 1 cycle | 0 | 0 |
|  | 2 cycle | 30 | 0 | x: Poor
Δ: Fair
: Good
: Excellent

It will be apparent from Table 4 that the addition of lecithin causes a decrease in % delamination in the immersion-peeling test, which means an improvement in bonding strength.

What is claimed is:

1. An aqueous emulsion adhesive composition comprising a vinyl acetate homopolymer or copolymer emulsion containing 0.5 to 3.0 weight parts lecithin per 100 parts nonvolatile matter.

2. An emulsion adhesive composition according to claim 1 wherein said lecithin is contained in a proportion of 1.0 to 2.0 weight parts to 100 weight parts of nonvolatile matter in said emulsion adhesive composition.

3. The emulsion adhesive of claim 1 containing vinyl acetate homopolymer.

4. The emulsion adhesive of claim 1 containing vinyl acetate copolymerized with at least one member selected from the group consisting of ethylene, acrylic acid, acrylic acid esters, methacrylic acid, methacrylic acid esters, 2-hydroxyethyl acrylate, N-methylolacrylamide and N-methylolacrylamide ether compounds.

* * * * *